United States Patent
McFarland, Jr.

(10) Patent No.: US 11,514,729 B2
(45) Date of Patent: Nov. 29, 2022

(54) TRANSPORT BEHAVIOR OBSERVATION

(71) Applicant: TOYOTA MOTOR NORTH AMERICA, INC., Plano, TX (US)

(72) Inventor: Stephen Paul McFarland, Jr., Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 356 days.

(21) Appl. No.: 16/805,373

(22) Filed: Feb. 28, 2020

(65) Prior Publication Data

US 2021/0272385 A1 Sep. 2, 2021

(51) Int. Cl.
| | |
|---|---|
| *G07C 5/00* | (2006.01) |
| *G06F 16/27* | (2019.01) |
| *G06F 16/23* | (2019.01) |
| *G06F 8/65* | (2018.01) |
| *G07C 5/02* | (2006.01) |

(52) U.S. Cl.
CPC ............ *G07C 5/008* (2013.01); *G06F 8/65* (2013.01); *G06F 16/2379* (2019.01); *G06F 16/27* (2019.01); *G07C 5/02* (2013.01)

(58) Field of Classification Search
CPC .......... G07C 5/008; G07C 5/02; G06F 16/27; G06F 16/2379; G06F 8/65
USPC ....................................................... 701/29.3
See application file for complete search history.

(56) References Cited

U.S. PATENT DOCUMENTS

| | | | |
|---|---|---|---|
| 7,089,099 B2 | 8/2006 | Shostak et al. |
| 7,222,187 B2 | 5/2007 | Yeager et al. |
| 7,310,675 B2 | 12/2007 | Salesky et al. |
| 8,892,271 B2 | 11/2014 | Breed |
| 9,082,238 B2 | 7/2015 | Ricci |
| 9,098,753 B1 | 8/2015 | Zhu et al. |
| 9,317,983 B2 | 4/2016 | Ricci |
| 9,384,609 B2 | 7/2016 | Ricci |
| 9,430,944 B2 | 8/2016 | Grimm et al. |
| 9,443,358 B2 | 9/2016 | Breed |
| 9,623,875 B2 | 4/2017 | Beyene et al. |
| 9,632,210 B2 | 4/2017 | Zhu et al. |
| 9,870,649 B1 | 1/2018 | Fields et al. |
| 9,946,531 B1 | 4/2018 | Fields et al. |
| 10,031,790 B1 | 7/2018 | Fuchs et al. |
| 10,044,817 B2 | 8/2018 | Vuyyuru et al. |
| 10,223,479 B1 | 3/2019 | Konrardy et al. |
| 10,501,091 B2 | 12/2019 | Kislovskiy et al. |

(Continued)

FOREIGN PATENT DOCUMENTS

| | | |
|---|---|---|
| CN | 1684454 A | 10/2005 |
| CN | 100423487 C | 10/2008 |

(Continued)

*Primary Examiner* — Gertrude Arthur Jeanglaude

(57) ABSTRACT

An example operation includes one or more of receiving indications from a plurality of transports, by a server, of another transport in proximity to the plurality of transports, forming a consensus, by the server, from the indications from the plurality of transports, and transmitting, by the server, a notification to one or more of the other transport and a device associated with the other transport, in response to the consensus. Each indication includes an identifier of the other transport and an identification of one or more ways the other transport is being operated in a different manner than intended.

20 Claims, 19 Drawing Sheets

(56) References Cited

U.S. PATENT DOCUMENTS

| | | |
|---|---|---|
| 10,522,033 B2 | 12/2019 | McClellan et al. |
| 10,748,419 B1 | 8/2020 | Fields et al. |
| 10,802,477 B1 | 10/2020 | Konrardy et al. |
| 10,950,065 B1 | 3/2021 | Fields et al. |
| 2005/0050538 A1 | 3/2005 | Kawamata et al. |
| 2005/0273218 A1 | 12/2005 | Breed et al. |
| 2008/0106436 A1 | 5/2008 | Breed |
| 2008/0258890 A1 | 10/2008 | Follmer et al. |
| 2009/0119657 A1 | 5/2009 | Link |
| 2009/0140887 A1 | 6/2009 | Breed et al. |
| 2013/0179689 A1* | 7/2013 | Matsumoto ............... G06F 8/61 713/168 |
| 2014/0303806 A1* | 10/2014 | Bai ................... G01C 21/3697 701/1 |
| 2014/0306799 A1 | 10/2014 | Ricci |
| 2015/0082297 A1 | 3/2015 | Parry et al. |
| 2015/0297146 A1 | 10/2015 | Pollack et al. |
| 2016/0041820 A1 | 2/2016 | Ricci et al. |
| 2016/0163133 A1 | 6/2016 | Ricci |
| 2016/0210131 A1 | 7/2016 | Vangelov et al. |
| 2016/0292403 A1 | 10/2016 | Gong et al. |
| 2017/0075677 A1 | 3/2017 | Gross et al. |
| 2017/0262277 A1 | 9/2017 | Endo et al. |
| 2018/0196656 A1 | 7/2018 | Miller et al. |
| 2018/0285088 A1 | 10/2018 | Lancioni et al. |
| 2018/0328743 A1 | 11/2018 | Sullivan |
| 2018/0342165 A1 | 11/2018 | Sweeney et al. |
| 2019/0166473 A1* | 5/2019 | Venkatraman ........ H04W 4/023 |
| 2019/0187976 A1 | 6/2019 | Lee |
| 2019/0205115 A1 | 7/2019 | Gomes |
| 2019/0268420 A1 | 8/2019 | Acharya et al. |
| 2020/0057630 A1 | 2/2020 | Cho et al. |
| 2020/0128375 A1 | 4/2020 | Shahmurad et al. |
| 2020/0167144 A1 | 5/2020 | You et al. |
| 2020/0348923 A1 | 11/2020 | Mezaael et al. |

FOREIGN PATENT DOCUMENTS

| | | |
|---|---|---|
| CN | 104103188 A | 10/2014 |
| CN | 103200165 B | 4/2016 |
| CN | 105718293 A | 6/2016 |
| CN | 107054377 A | 8/2017 |
| CN | 107531245 A | 1/2018 |
| CN | 101390050 B | 4/2018 |
| CN | 107945311 A | 4/2018 |
| EP | 2859414 A2 | 4/2015 |
| EP | 2950278 A2 | 12/2015 |
| EP | 3239686 A1 | 11/2017 |
| ES | 2714592 | 5/2019 |
| JP | 2012133789 A | 7/2012 |
| KR | 101480929 B1 | 1/2015 |
| KR | 20170119842 A | 10/2017 |
| KR | 102051888 B1 | 12/2019 |
| TW | 201440008 A | 10/2014 |
| WO | 2007055809 A2 | 5/2007 |
| WO | 2019009454 A1 | 1/2019 |

* cited by examiner

TRANSPORT BEHAVIOR OBSERVATION

TECHNICAL FIELD

This application generally relates to correcting non-optimal operation of a transport, and more particularly, to transport behavior observation.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Transports already include cameras and sensors for accident avoidance and parking assistance. They provide images to drivers to assist in maneuvering a transport or not maneuvering a transport to avoid potential accidents. Although such cameras and sensors are primary used for improvements related to the same transport, in some cases such cameras and sensors may be used to improve operation of other transports.

SUMMARY

One example embodiment provides a method that includes one or more of receiving, by a memory on a transport, a first portion of a software update from a server, and in response to at least one device associated with the transport is proximate to the transport, receiving, by the memory, a second portion from the at least one device, performing, by a processor on the transport, the software update, and providing, by the transport, a notification of a completion of the software update to the at least one device.

Another example embodiment provides a transport that includes a processor and a memory, coupled to the processor. The memory includes instructions that when executed by the processor are configured to perform one or more of receive, by the memory, a first portion of a software update from a server. In response to at least one device associated with the transport is proximate to the transport, the memory receives a second portion from the at least one device, the processor performs the software update, and the transport provides a notification of a completion of the software update to the at least one device.

A further example embodiment provides a non-transitory computer readable medium comprising instructions, that when read by a processor, cause the processor to perform one or more of receiving, by a memory on a transport, a first portion of a software update from a server, in response to at least one device associated with the transport is proximate to the transport, receiving, by the memory, a second portion from the at least one device, performing, by a processor on the transport, the software update, and providing, by the transport, a notification of a completion of the software update to the at least one device.

One example embodiment provides a method that includes one or more of detecting, by a transport, a difference between sensor data associated with a location outside the transport and data stored on the transport and updating, by the transport, the data stored on the transport with the difference.

Another example embodiment provides a transport that includes a processor and a memory, coupled to the processor. The memory includes instructions that when executed by the processor are configured to perform one or more of detect, by the transport, a difference between sensor data associated with a location outside the transport and data stored on the transport and update, by the transport, the data stored on the transport with the difference.

A further example embodiment provides a non-transitory computer readable medium comprising instructions, that when read by a processor, cause the processor to perform one or more of detecting, by a transport, a difference between sensor data associated with a location outside the transport and data stored on the transport and updating, by the transport, the data stored on the transport with the difference.

One example embodiment provides a method that includes one or more of receiving indications from a plurality of transports, by a server, of another transport in proximity to the plurality of transports, forming a consensus, by the server, from the indications from the plurality of transports, and transmitting, by the server, a notification to one or more of the other transport and a device associated with the other transport, in response to the consensus. Each indication includes an identifier of the other transport and an identification of one or more ways the other transport is being operated in a different manner than intended.

Another example embodiment provides a transport that includes a processor and a memory, coupled to the processor. The memory includes instructions that when executed by the processor are configured to perform one or more of receive indications from a plurality of transports of another transport in proximity to the plurality of transports, form a consensus from the indications from the plurality of transports, and transmit a notification to one or more of the other transport and a device associated with the other transport, in response to the consensus. Each indication includes an identifier of the other transport and an identification of one or more ways the other transport is being operated in a different manner than intended.

A further example embodiment provides a non-transitory computer readable medium comprising instructions, that when read by a processor, cause the processor to perform one or more of receiving indications from a plurality of transports, by a server, of another transport in proximity to the plurality of transports, forming a consensus, by the server, from the indications from the plurality of transports, and transmitting, by the server, a notification to one or more of the other transport and a device associated with the other transport. In response to the consensus, each indication includes an identifier of the other transport and an identification of one or more ways the other transport is being operated in a different manner than intended.

DETAILED DESCRIPTION

Figure 1A:
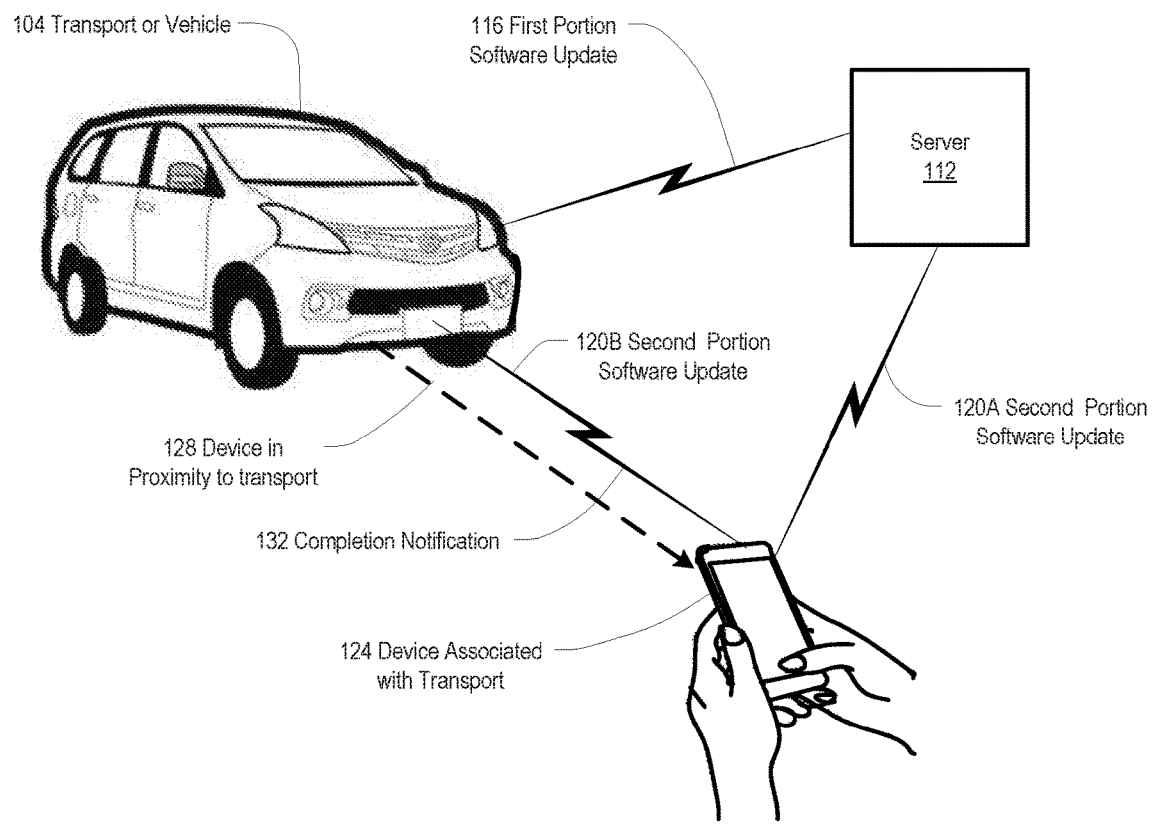
FIG. 1A illustrates an example diagram of a transport software update, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates an example diagram of a transport software update 100, according to example embodiments. The present application discloses a software update for a transport or vehicle 104. The software update may include a first portion 116 for the transport 104 and a second portion 120A/120B through one or more occupant devices 124 of the transport 104. The second portion 120B may be transferred to the transport 104 from the one or more occupant devices 124 in response to the one or more occupant devices 124 being in proximity to the transport 104. In response to the software update completed, a notification may be sent to the one or more occupant devices 124.

The application solves a potential security problem with transport 104 software updates by allocating a portion 120A/120B of a software update to a user device 124 associated with a transport 104. When the user device 124 moves within proximity of the transport 104, the portion 120B on the user device 124 may be transferred to the transport 104, which may then install the complete software update 116/120B. This also puts the user of the user device 124 in the loop and may allow human approval to perform the software update. By dividing the software update into multiple parts 116/120A/120B, any one part being compromised or corrupted may not alter, invalidate, or change the entire software update.

A software update may be divided into multiple parts, including at least a first portion software update 116 and a second portion software update 120A/120B. The first portion software update 116 may be related to different function software application(s), data structure(s), and metadata for the transport 104. For example, in one embodiment the first portion software update 116 may include engine and emission controls while the second portion software update 120A/120B may include new programming choices for a satellite-=based entertainment system. A server 112 transmits the first portion of a software update 116 to a transport or vehicle 104. The first portion software update 116 may be transmitted over any wireless communication technology including but not limited to BLUETOOTH, WI-FI, or a cellular data connection such as 3G/4G/5G or LTE. In some embodiments, the first portion software update 116 may be communicated to the transport 104 through a hardware means such as an SD card or USB dongle. The transport or vehicle 104 may include several processors, and the software update may run on a single processor, two or more processors, or all processors. The software update includes at least two portions, with the first portion being transferred directly to the transport 104. The transport 104 may also include one or more memories, transceivers, receivers, and sensors to allow for the software update to be received.

The server 112 also transfers, either at the same time as the first portion 116 or at a later time, a second portion of the software update 120A to a user device 124 associated with the transport 124. The user device 124 may be associated with a user, who may also be associated with the transport 104. In other embodiments, a third or more software update (not shown) may be transmitted to other user devices (not shown), which either do or do not cooperate to transfer those portions to the transport 104. In other embodiments, the third or more software update may also be transferred to the user device 124, so that the user device 124 receives multiple portions of the software update. In other embodiments, the transport 104 may determine one or more (other) compatible transports in proximity to the transport 104 and transfer one or more portions to the one or more compatible transports. This may allow portions to be distributed to other transports that may use all or part of the software update. The transport 104, in some embodiments, may determine that the transport 104 uses a same or newer version of the first portion software update 116. In response, the transport 104 may notify the server 112 that the first portion software update 116 may not be installed.

When the user device 124 moves within proximity to the transport 128, the user device 124 transfers the second portion of the software update 120B to the transport or vehicle 104. The proximity 128 may be related to a wireless communication range between the user device 124 and the transport 104. In one embodiment, after the user device 124 receives the second portion of the software update 120A, the user device 124 wirelessly emits a beacon signal on a random, one-time, or continuous basis. The user device 124 monitors for a response from the transport 104. After receiving the response from the transport 104, the user device 124 wirelessly transmits the second portion of the software update 120B to the transport 104. In other embodiments, the user device 124 may transmit an SMS message, an email, or make a call to a phone device associated with the transport 104. The transport 104 then responds in similar or different fashion to the user device 124, when enables the user device 124 to wirelessly transmit the second portion of the software update 120B to the transport 104.

In another embodiment, the proximity 128 may be related to a geofence. In another embodiment, the proximity 128 may be related to a location either the user device 124 or transport 104 is at. In other embodiments, a third or more software update (not shown) may be transmitted from other user devices (not shown), which either do or do not cooperate to transfer those portions to the transport 104. In other embodiments, a third or more software update 120 may also be transferred from the user device 124, so that the user device transfers multiple portions of the software update to the transport or vehicle 104. In some embodiments, a master software update to the transport 104 may include first, second, and third portions, where the third portion updates one or more occupant devices of a different type than occupant device(s) 124 receiving the second portion of software update 120A. This may allow different types of occupant devices such as iPhones, Android devices, and tablets or notebook computers running different operating systems to be concurrently updated. In some embodiments, the second portion received by the one or more devices may include a second portion of the software update itself. In one embodiment, a user device 124 may receive second 120A/120B and third portions of a software update. One of the second 120A/120B and third portions of the software update may be usable by the user device 124, while the other of the second and third portions are intended for a different device. In that case, the user device 124 may first determine it can communicate with the different device. After making that determination, the user device 124 may then transfer the other of the second and third portions to the different device. Communication may be determined by any known methods including a beacon or other wireless signal, sending a SMS message, email, or making a cellular phone call.

In one embodiment, the transport 104 may validate one or more portions of the software update after the transport 104 has received them, in order to ensure the integrity of the software update and a reliable update process. Received portions of software updates may be stored in one or more memory devices of the transport 104. In one embodiment, a transport 104 may have several computers or processors for different functions, and each computer or processor may have one or more associated memory devices. Each received portion of a software update may include an identifier that the transport 104 reads in order to determine which memory device to store the portion to. The identifier may also include a memory range that specifies a location in the memory for storing the software update portion. In another embodiment, the transport 104 validates the entire software update after all portions have been received. Validation may include any of integrity checking, combining, compiling, version checking, storing, or any other action performed on the software update or software update portions by one or more computers of the transport 104.

In one embodiment, the transport 104 may install the complete software update after all portions have been received. Installation may include parsing the complete software update into portions, associating each portion with a memory device and/or a location in a memory, and storing each portion into an appropriate memory device and/or location. In another embodiment, the transport 104 installs at least the first portion 116 when it receives it, and may store one or more other portions until all portions of the software update have been received. In another embodiment, the transport 104 installs each portion (regardless of how many portions) when it receives it. Once the user device 124 has transferred the second (or third, etc) portion(s) of the software update 120 to the transport 104, the transport 104 provides a completion notification 132 to the user device 124. In another embodiment, the transport 104 may provide a completion notification 132 to acknowledge receipt of all portions and/or successful installation of the complete software update (all portions). The completion notification 132 may include an SMS message, an email, an image, or a video that informs the user of the user device 124 that the software update has been completed. In another embodiment, the transport 104 may display a notification of completion of the software update on a display associated with the transport 104 and/or provide an audio notification of completion of the software update.

Figure 1B:
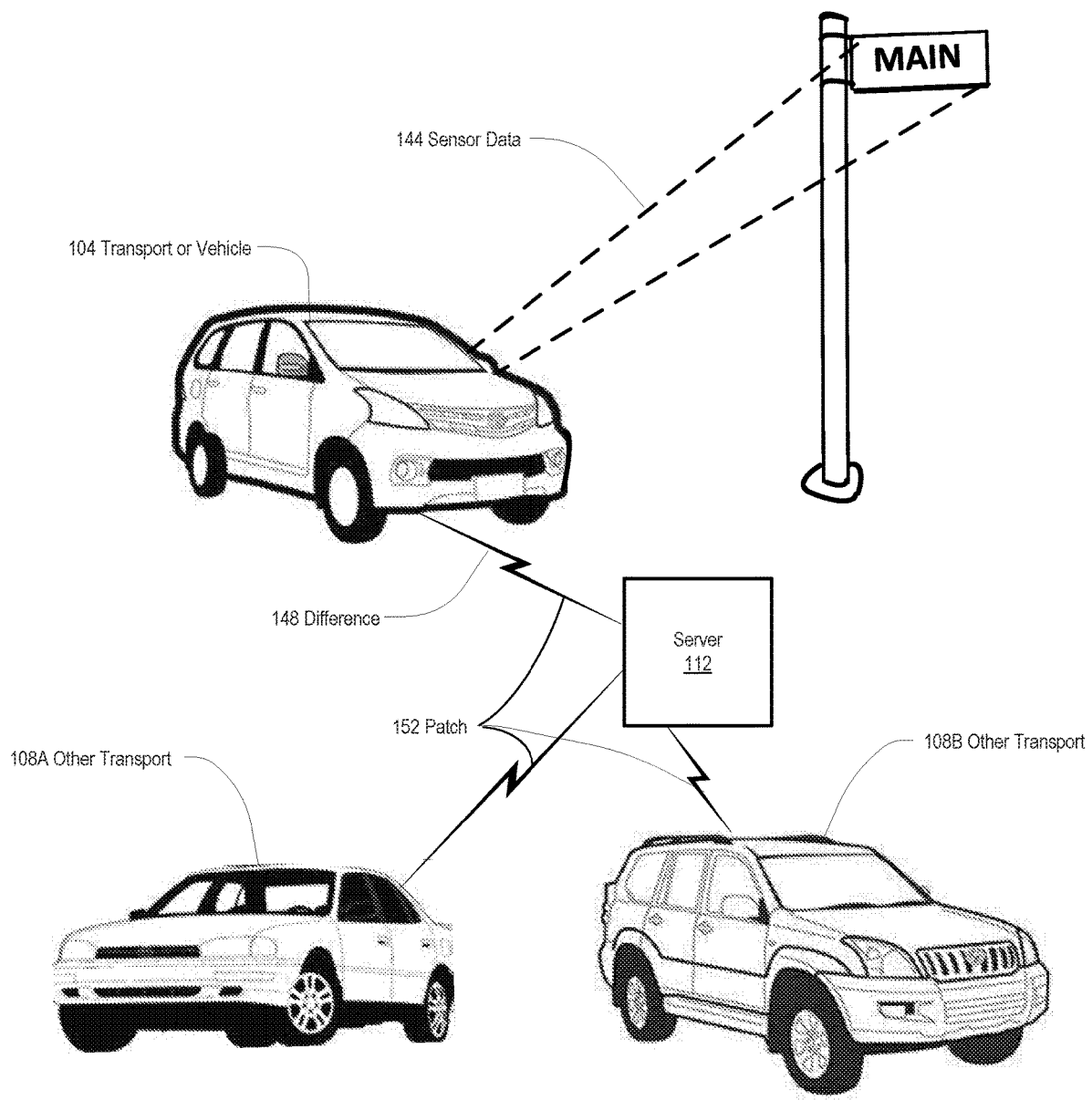
FIG. 1B illustrates an example diagram of data discrepancy resolution for a transport, according to example embodiments.

FIG. 1B illustrates an example diagram of data discrepancy resolution for a transport 140, according to example embodiments. Transports or vehicles 104 may include sensors including cameras, radar, lidar, or other items that sense location areas outside and in proximity to the transport 104. Sensors obtain sensor data 144 of these outside items. Sensor data 144 may include camera images of a traffic accident, construction, one or more signs, and/or a road or traffic condition. The transport 104 may identify one or more objects at the location from the sensor data 144. It may identify the objects using image interpretation software, pattern matching, optical character recognition (OCR), and comparison to satellite or other data. In one embodiment, the sensor data 144 may include one or more of a camera image, a notification from a transport entertainment system, and drivetrain sensor data.

In some cases, transports 104 have stored sensor data that is stored on the transport 104. Stored sensor data may include text, images, video, or various data items. When the transport 104 receives new sensor data 144 at a location, it checks to see if the received sensor data 144 is the same as stored sensor data. Identified objects are compared to stored data on the transport 104. If the received sensor data 144 is the same as the stored sensor data, the transport 104 continues to receive and evaluate sensor data 144. However, in some cases, the transport 104 may detect a difference between the stored and received 144 sensor data. In that case, the transport 104 may update the data stored on the transport 104 with the received sensor data 144, and transmits a request including the received sensor data 144 or the difference 148 to a server 112. Differences 148 may include camera images of a traffic accident, construction, one or more signs, and/or a road or traffic condition. In one embodiment, the transport 104 may determine the stored data includes one or more elements that correspond to the difference 148 between the stored data and the sensor data 144, and updates the one or more elements with the difference 148. The request may include an identification of the transport 104, a current software level of the transport 104, and a difference between the current software level and the latest software update. The latest software update may include a software application and one or more of release notes for the latest software update and an installation application.

In one embodiment, providing a request including the sensor data 144 or difference 148 to a server 112 may include generating, by the transport 104, a blockchain transaction to the server 112. The server 112, the transport 104, and/or the other transports 108A, 108B may be one of nodes or peers of a blockchain network. The server 112 may also store any of the sensor data 144, the difference 148, and/or the patch 152 to a shared ledger of the blockchain network.

The server 112 receives the request, and creates a patch 152 including the sensor data 144 or the difference 148. The patch 152 may be used to update the stored sensor data in transports. The server 112 transmits the patch 152 to other transports 108 in proximity to the location where the difference was first identified. Any number of transports 108 may receive the patch 152, and FIG. 1B illustrates two transports 108A and 108B that receive the patch 152. In another embodiment, the transport 104 that identified the difference may also receive the patch 152. In some embodiments, a patch 152 may include other stored data updates, including permanent changes or differences reported by other transports 108. In some embodiments, a transport 104, 108A, 108B may display information related to a received patch 152. The displayed information may include one or more of a patch 152 name, a version number, a date, a compatible transports list, a size of the patch 152, or the contents of the patch 152 itself. The contents may include one or more images, videos, text items, or data items.

In one embodiment, updating the transport 104 with the latest software update may include identifying one or modules within the latest software update; associating the one or more modules with the sensor data 144; and updating one or more of an application and a data structure with the one or more modules. In one embodiment, the server 112 may provide the patch 152 live to other transports 108 that enter proximity range to the location, for example within a mile of the location.

In another embodiment, the sensor data 144 and differences 148 may reflect reverse cases such as a cleared traffic accident, a pothole or other road damage repaired, road barriers removed—in other words a temporary condition that becomes cleared. The stored data in such cases may be immediately updated to reflect the cleared condition, possibly without generating the request and a patch 152 being issued.

In another embodiment, a transport 104 or a server 112 may determine the differences 148 between the sensor data 144 and the stored data as before, but is able to estimate a time to clear based on the differences 148. The time to clear may be determined by comparing the sensor data 144 to a series of stored images that display different traffic accidents or road repair of varying "severity", each with an associated repair time. By matching a closest stored image/repair time to the sensor data 144, a most likely repair time may be determined. In one embodiment, the transport 104 may provide the estimated repair time to the server 112 or other transports 108A, 108B in proximity to the location. The other transports 108A, 108B may be able to take advantage of this information by delaying starting out until the repair or accident is cleared, or taking a different route that bypasses the location.

For example, one or more sensor(s) of a transport 104 may detect a new street sign in a new neighborhood. The street sign may have been just recently installed, and may reflect a new street name. The transport 104 may include a navigation computer that includes various maps including streets and street names. When the sensor(s) observe the new street name ("Main Street"), the transport 104 may check its' stored data to see if the street name is present. Because the stored data was installed to the transport 104 before the street name was assigned, the new street name is not found in the stored data. Therefore, the street name at the location becomes a difference 148 that the transport 104 sends to the server 112. The server 112 then creates a patch 152 that includes the new street name (and possibly other differences 148 received since a previous patch 152 was issued), and distributes the patch 152 including the new street name to other transports 108A, 108B that are in proximity to the transport 104 when it first observed the street name. The other transports 108A, 108B, in response, update their own stored data to include the patch 152 and the new street name.

Figure 1C:
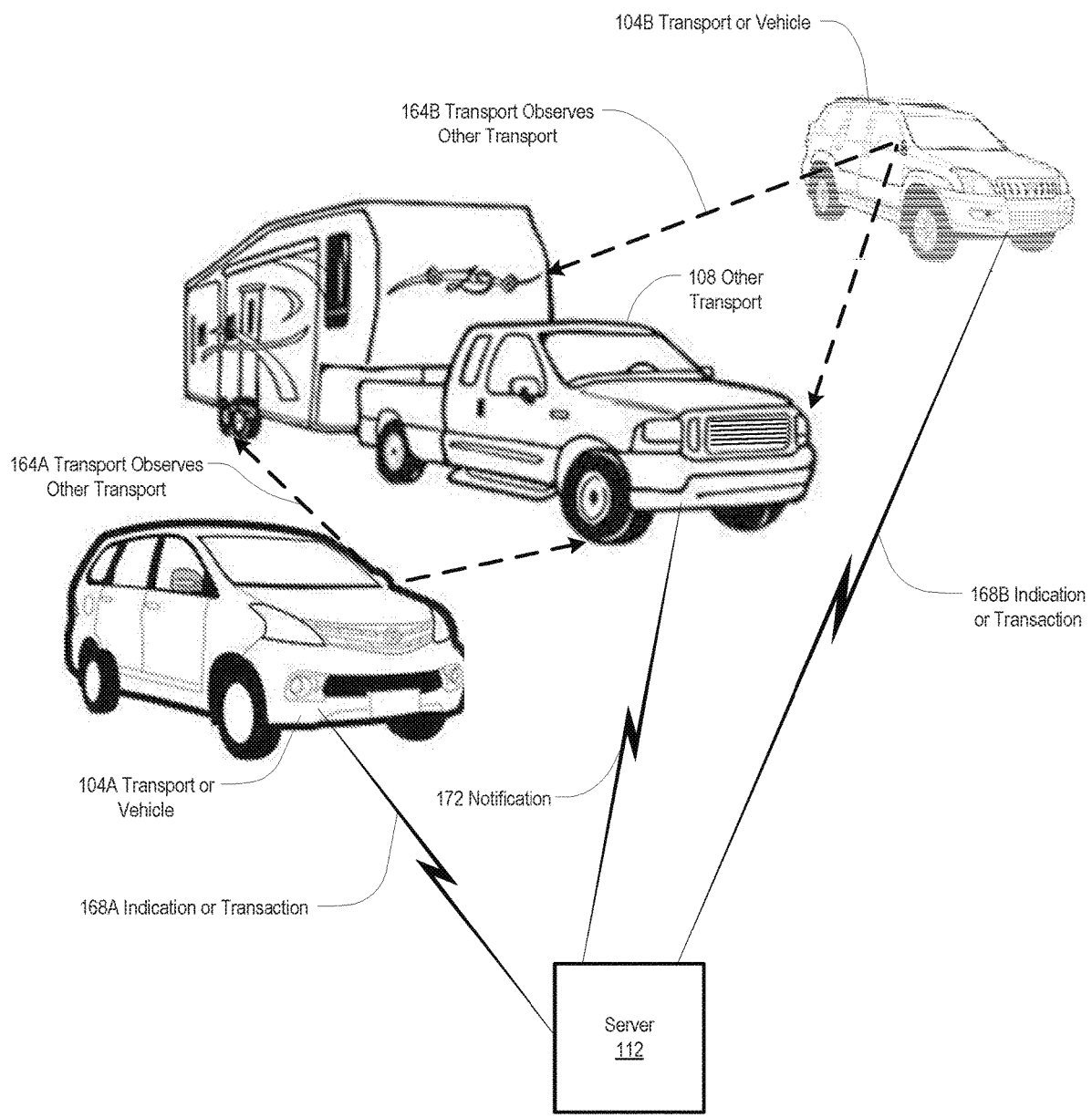
FIG. 1C illustrates an example diagram of transport behavior observation, according to example embodiments.

FIG. 1C illustrates an example diagram of transport behavior observation 160, according to example embodiments. Transports 104 include various sensors, including cameras, that may observe other transports 108 in proximity. In most embodiments, "in proximity" means within a line of sight of the transport 104, and preferably close enough to observe details of the other transport 108 and how it is being operated. A transport's behavior relates to how it is being operated, and includes a transport's speed, acceleration, traction in weather, handling, seating capacity, load carrying capacity, towing capacity, and the like. Transports have performance characteristics that depend on the design of a transport, its intended use, price, and region where purchased. A transport's performance may also be related to characteristics of a driver—such as a driver's eyesight, reaction time, confidence, and driving ability. Thus, a transport's actual performance is a combination of both a transport's automotive characteristics and performance and a driver's characteristics. In some embodiments, the performance of a transport is limited by automotive characteristics of the transport itself, while in other embodiments, the performance of a transport is limited by limitations of the driver. In yet other embodiments, the performance of a transport may be limited by both automotive characteristics of the transport and by limitations of the driver.

Multiple transports 104, identified as transport or vehicle 104A and transport or vehicle 104B, are in proximity to another transport 108. Each of the transports 104A, 104B, 108 may be a same or different type. In FIG. 1C, transports 104 are passenger vehicles while transport 108 is a pickup truck towing a large 5'-wheel trailer. Each of the transports 104A, 104B includes side-vision cameras that observe the transport 108. Transport 104A observes the other transport 164A and transport 104B observes the other transport 164B.

Each transport 104A, 104B independently observes 164A, 164B how the other transport 108 is being operated, as described previously, and makes a determination the other transport 108 is not being operated as intended. The determination may be that the other transport 108 is overloaded in some fashion, the other transport 108 is in obvious need of repair (emitting a very excessive amount of exhaust smoke, for example), the other transport 108 is being accelerated too slowly, has improper tire pressure in one or more tires, has one or more blocked mirrors, or is being operated in any other fashion that may be not as the other transport 108 was intended to operate. Once the transport 104A, 104B makes this determination, the transport 104A, 104B provides an indication or transaction 168 to a server 112. In one embodiment, each transport 104A, 104B examines itself using the same behavior criteria as the other transport 108, and provides a notification to itself or a device associated with the transport 104 similar to what would be provided to the other transport 108, as described herein.

The indication or transaction 168 (i.e. indication or transaction 168A from transport 104A and indication or transaction 168B from transport 104B) provides an identification of the other transport 108 as well as a behavior of the other transport 108 not as intended. The identification of the other transport 108 may include a camera image, a Vehicle ID Number (VIN Number), a license plate number, a state of registration (either the US state where the vehicle is registered as well as an indication if the registration is current), and/or a physical description (i.e. model year, manufacturer, model, color, etc) of an exterior of the other transport 108. The identification allows the server 112 to uniquely identify the other transport 108 from all other transports 104, 108 so that a notification 172 may be sent to the other transport 108 or a device associated with the other transport 108.

In one embodiment, indications 168A, 168B are blockchain transactions, where a blockchain network includes the transports 104A, 104B and the server 112. The blockchain transactions 168A, 168B provide information to the server 112 and are stored to a shared ledger associated with the blockchain network.

In another embodiment, a transport 104 may identify one or more other transports 108 that use a software module, and obtain a current software level for the software module from one or more other transports 108. In response to determining the current software level from another transport 108 is more recent than a current software level for the other transport 108, the transport 104 may request the more recent software update from another transport 108, install the more recent software update, and in response to the transport 104 determines the current software level from another transport 108 is older than the current software level for the other transport 108, the transport 104 transfers a software update corresponding to the current software level for the other transport 108 to another transport 108 that includes an older software level.

The server 112 receives the indications or transactions 168 from multiple transports or vehicles 104. Although two such transports or vehicles 104A, 104B are shown in FIG. 1C, there may be any number of transports 104 providing such information as long as two or more transports 104 are involved. The server 112 forms a consensus after receiving indications or transactions 168 from multiple transports 104. In one embodiment, the server 112 forms a first consensus after receiving multiple indications or transactions 168, and performs additional consensus after receiving a next following indication or transaction 168. Each of the received indications or transactions 168 used for a consensus must apply to a same other transport 108. In one embodiment, a consensus may be formed if a majority of the received indications or transactions 168 apply to a same other transport 108. In another embodiment, a consensus may be formed if a majority of the received indications or transactions 168 apply to a same other transport 108, and a same behavior is identified. In another embodiment, a same behavior may be identified by multiple transports 104 prior to forming the consensus. In one embodiment, the server 112 matches a behavior pattern associated with the other transport 108 to a different type of transport than the other transport 108 and/or a different way of operating the other transport 108. For a blockchain network, a consensus may be performed by a majority of validating nodes or peers.

Once a consensus has been performed by the server 112, the server 112 transmits a notification 172 to the other transport 108 and/or one or more devices (such as cell phones/smart phones) associated with the other transport 108. The notification 172 may provide information about the behavior not as intended, how to correct the behavior not as intended, a new other transport 108 type or description, or a proposed change or modification to the other transport 108. In one embodiment, the notification 172 may include a different type of transport than the other transport 108 and/or a different way of operating the other transport 108. For example, the notification 172 may indicate the other transport 108 may be overloaded, encourage a driver of the other transport 108 to remove cargo or passengers from the other transport 108, recommend and upgrade to a newer or different transport 108 type with higher load capacity, or recommend the other transport 108 driver to select a different transmission gear ratio on a control of the other transport 108. In one embodiment, the notification 172 may include an upgrade recommendation for the other transport 108, including a feature or software upgrade. In another embodiment, the notification 172 may include a downgrade recommendation for the other transport 108, including a feature or software downgrade.

Figure 2A:
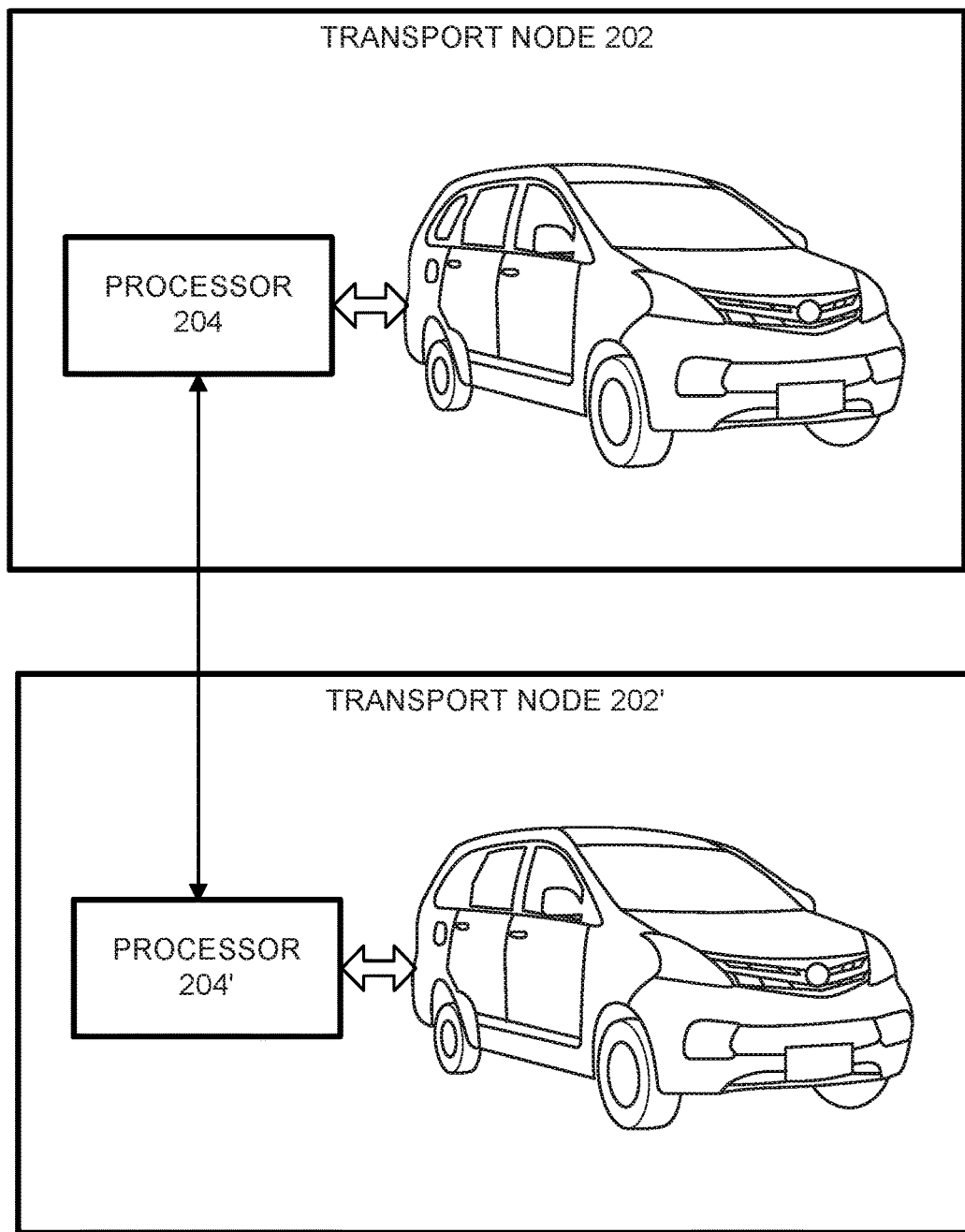
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
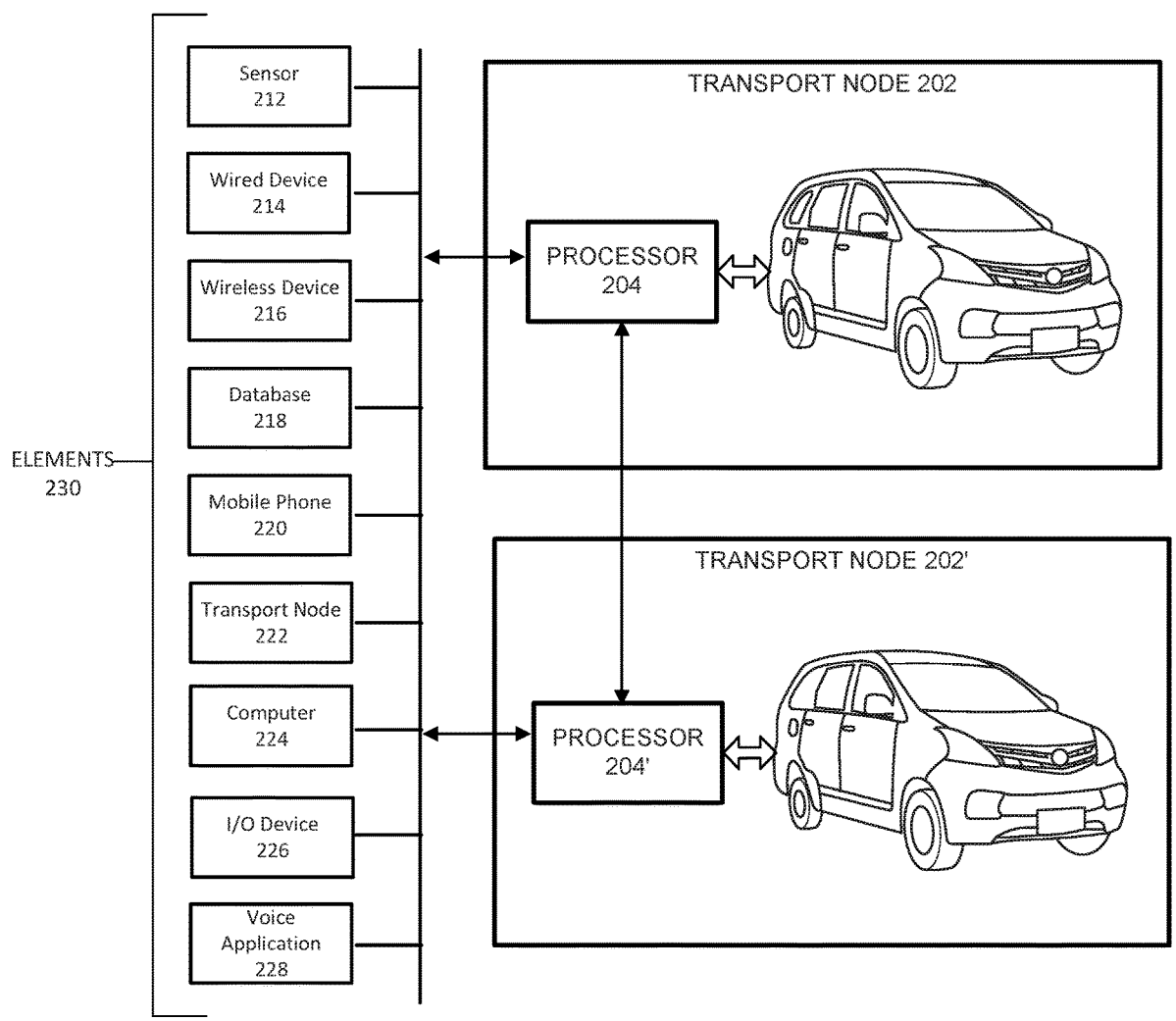
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
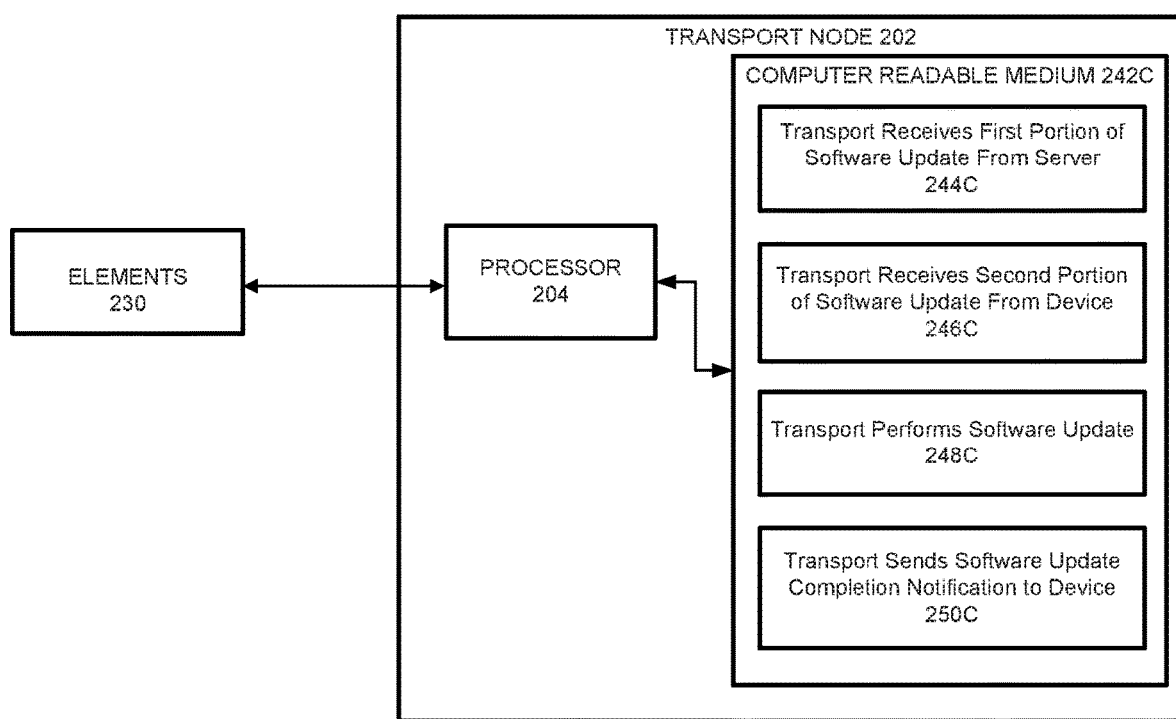
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of the following steps. At step 244C, the transport memory receives a first portion of a software update from a server. The software update includes at least two portions. The first portion is transferred to the transport by the server, and a second portion is provided to a user device. At step 246C, the transport memory receives a second portion of the software update from a user device in proximity to the transport. At step 248C, a transport processor performs the software update. Finally, at step 250C, the transport provides notification of completion of the software update.

Figure 2D:
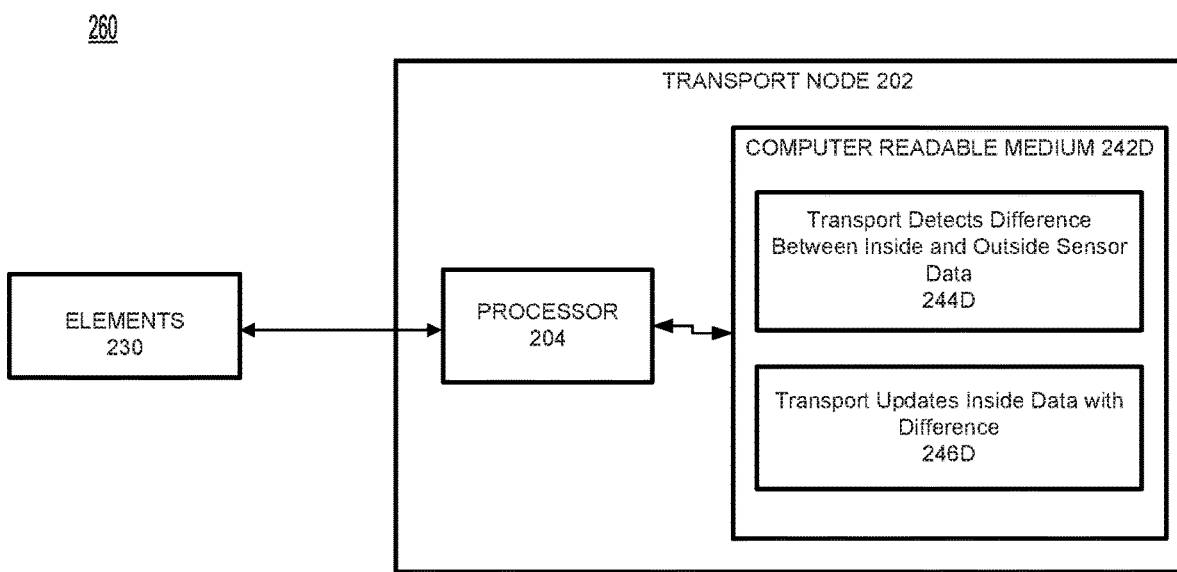
FIG. 2D illustrates a further transport network diagram, according to example embodiments.

FIG. 2D illustrates yet another transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of the following steps. At step 244D, the transport detects a difference between inside and outside sensor data. The inside data is data stored on the transport, while the outside data is sensor data reflecting the environment outside the transport. At step 246D, the transport updates the data stored on the transport with the difference. In one embodiment, the transport transmits a request including the sensor data to a server. The server then creates a patch including the sensor data, and transmits the patch to other transports in proximity to a location outside the transport.

Figure 2E:
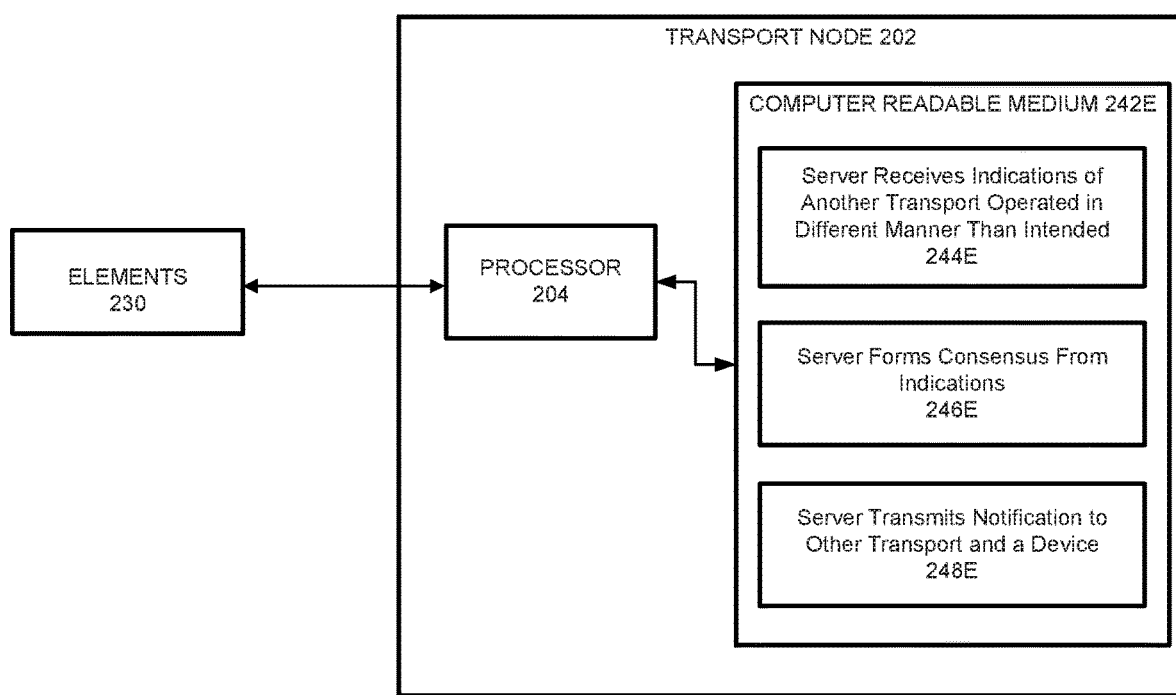
FIG. 2E illustrates a yet further transport network diagram, according to example embodiments.

FIG. 2E illustrates yet another transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of the following steps. At step 244E, a server receives one or more indications of another transport operated in a different manner than intended. The indications include an identifier of the other transport and an identification of one or more ways the other transport is being operated in a different manner than intended. At step 246E, the server forms a consensus from the received indications. At step 248E, the server transmits a notification to other transports and a device associated with the other transport. The notification may provide a recommendation or suggestion of an alternate type of transport.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
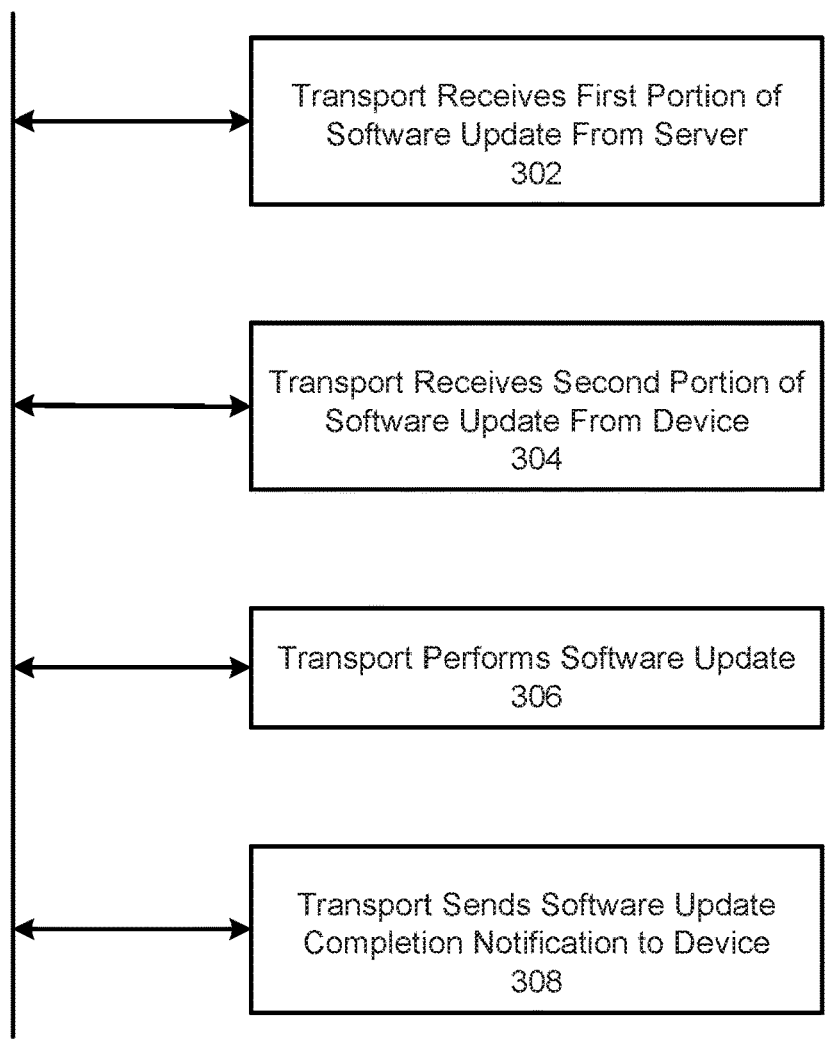
FIG. 3A illustrates a flow diagram, according to example embodiments.

FIG. 3A illustrates a flow diagram 300, according to example embodiments. Referring to FIG. 3A, at block 302, the transport memory receives a first portion of a software update from a server. The software update includes at least two portions. The first portion is transferred to the transport by the server, and a second portion is provided to a user device. At block 304, the transport memory receives a second portion of the software update from a user device in proximity to the transport. At block 306, a transport processor performs the software update. Finally, at block 308, the transport provides notification of completion of the software update.

Figure 3B:
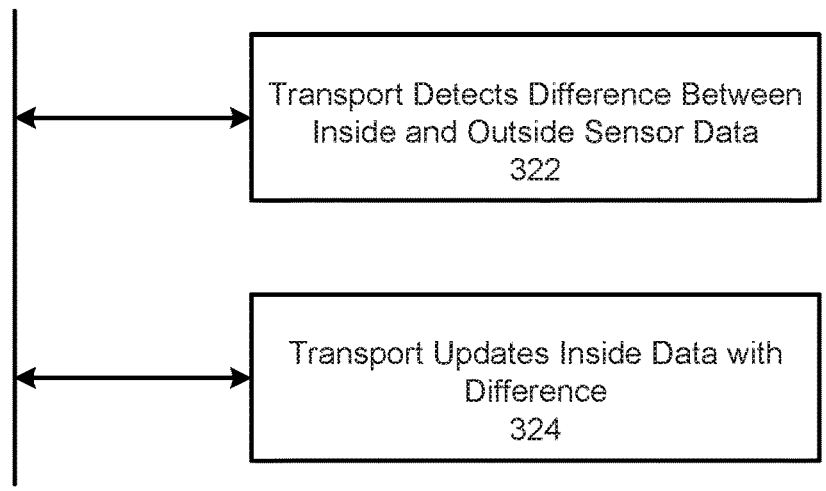
FIG. 3B illustrates another flow diagram, according to example embodiments.

FIG. 3B illustrates another flow diagram 320, according to example embodiments. Referring to FIG. 3B, at block 322, the transport detects a difference between inside and outside sensor data. The inside data is data stored on the transport, while the outside data is sensor data reflecting the environment outside the transport. At block 324, the transport updates the data stored on the transport with the difference. In one embodiment, the transport transmits a request including the sensor data to a server. The server then creates a patch including the sensor data, and transmits the patch to other transports in proximity to a location outside the transport.

Figure 3C:
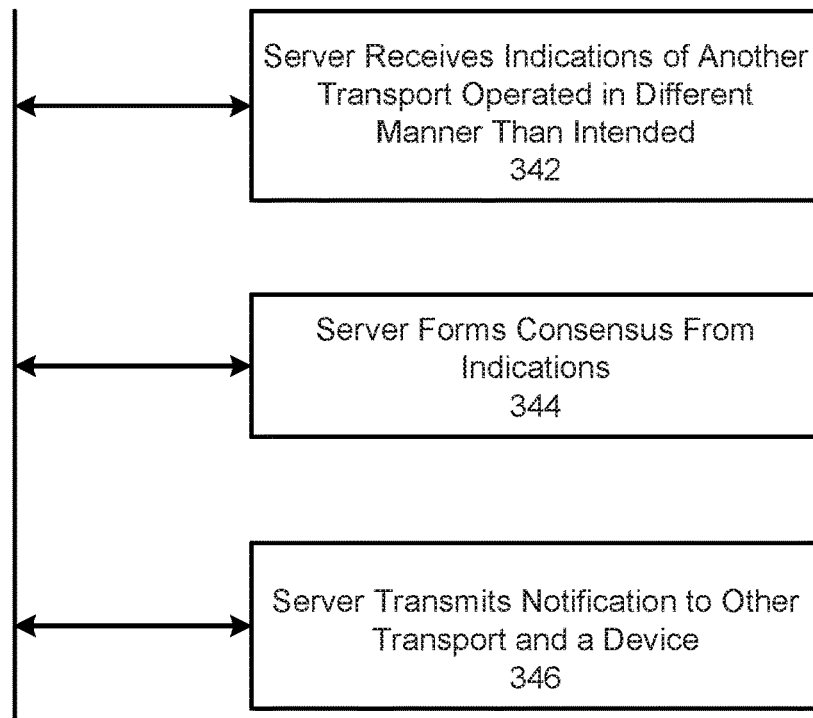
FIG. 3C illustrates yet another flow diagram, according to example embodiments.

FIG. 3C illustrates yet another flow diagram 340, according to example embodiments. Referring to FIG. 3C, at block 342, a server receives one or more indications of another transport operated in a different manner than intended. The indications include an identifier of the other transport and an identification of one or more ways the other transport is being operated in a different manner than intended. At block 344, the server forms a consensus from the received indications. Finally, at block 346, the server transmits a notification to other transports and a device associated with the other transport. The notification may provide a recommendation or suggestion of an alternate type of transport.

Figure 4:
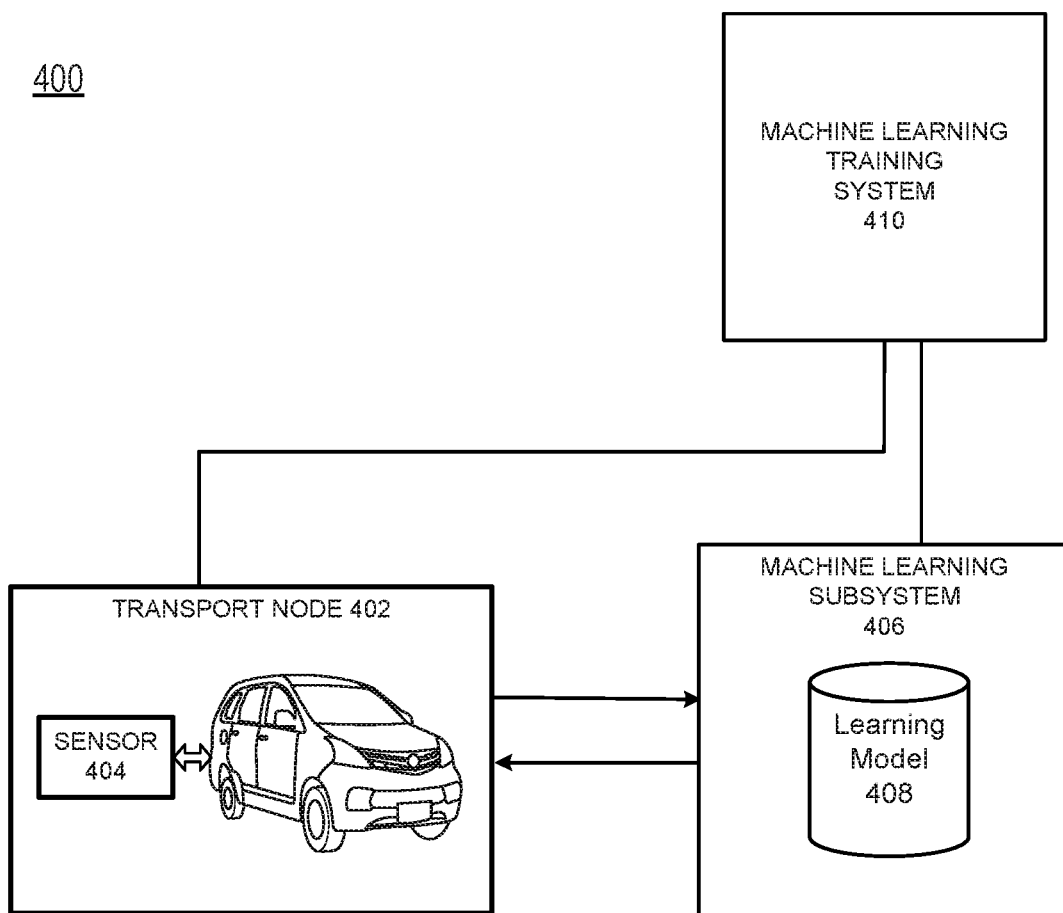
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
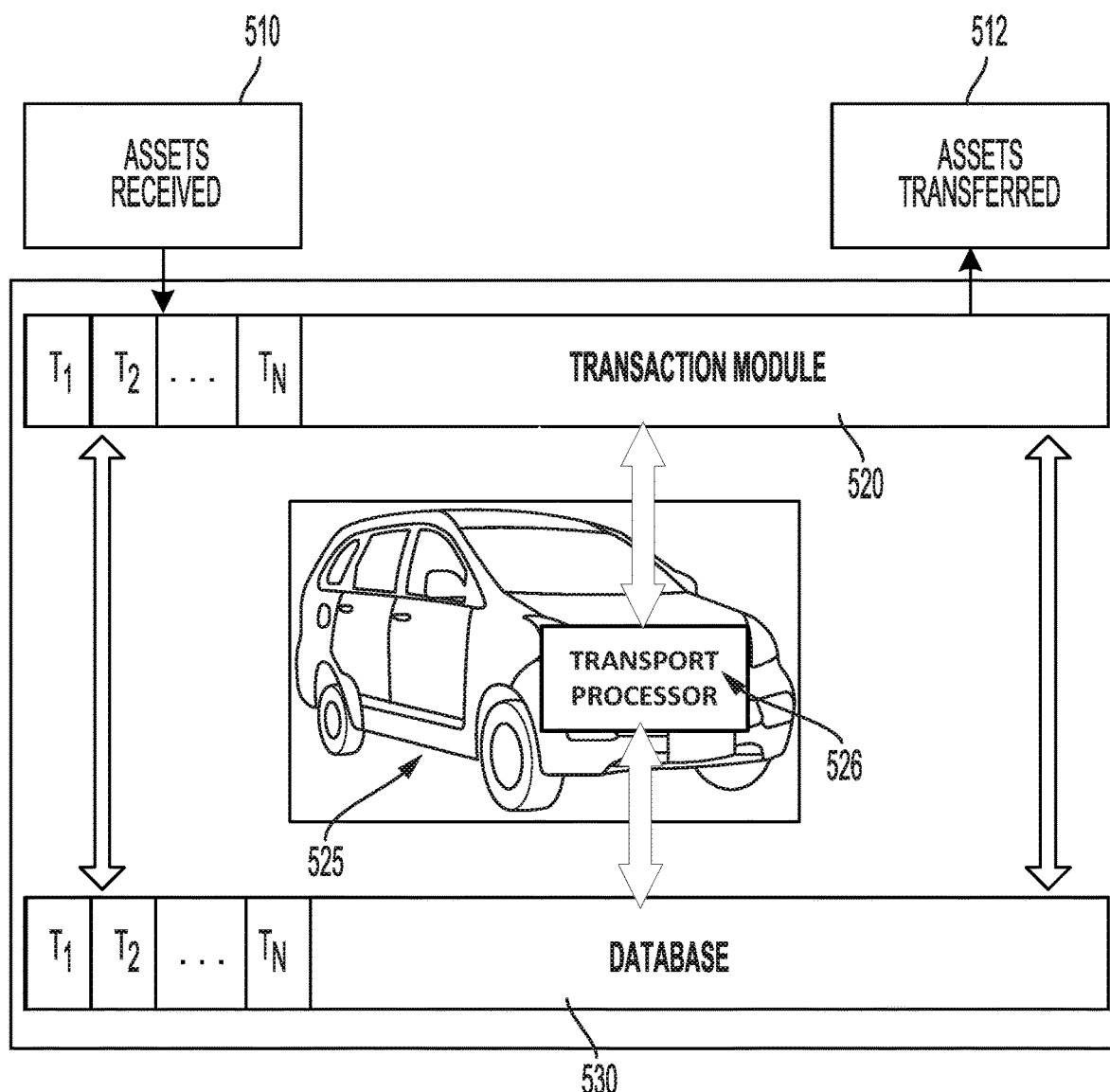
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
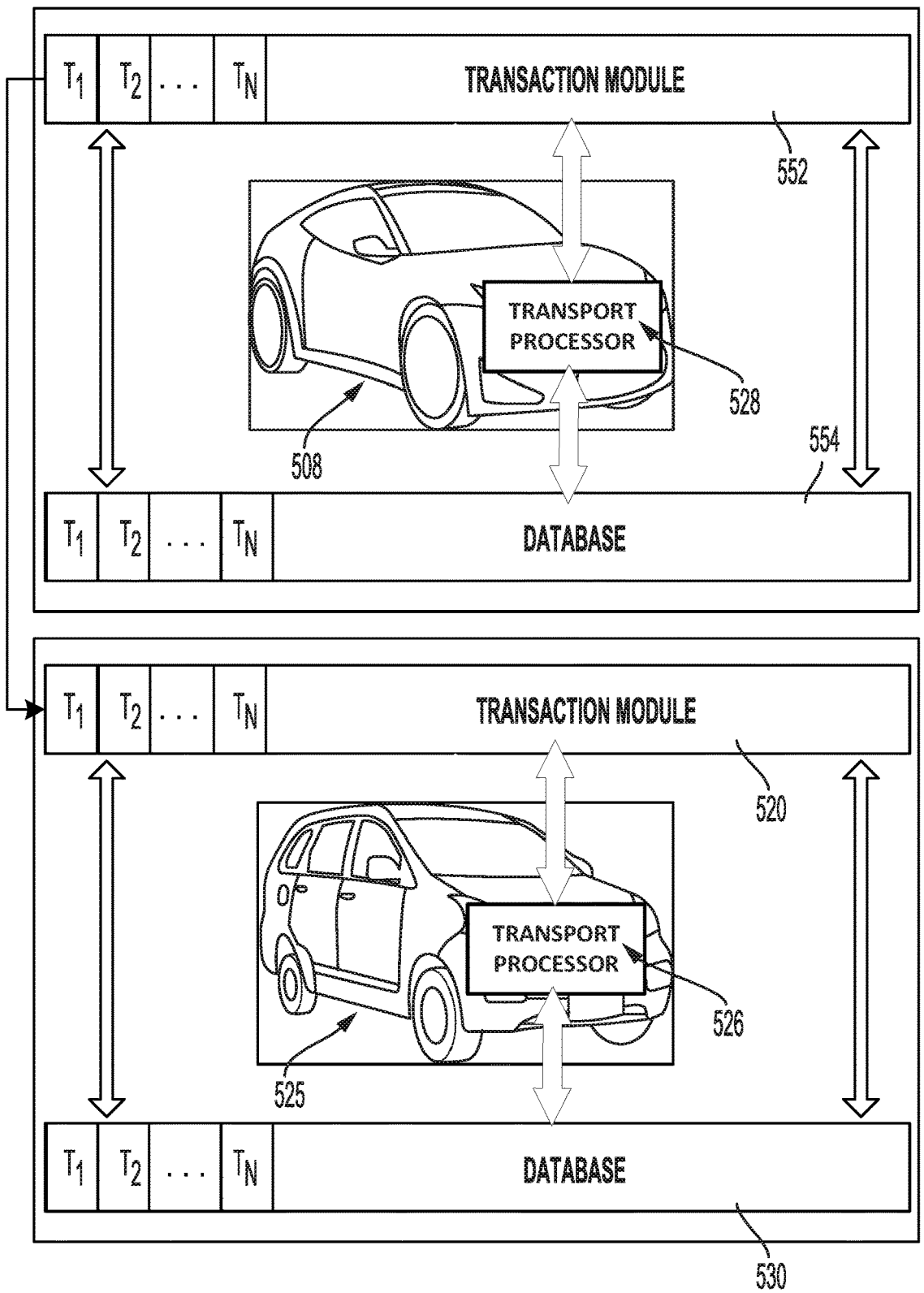
FIG. 5B illustrates another example vehicle configuration for managing database transactions conducted among various vehicles, according to example embodiments

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
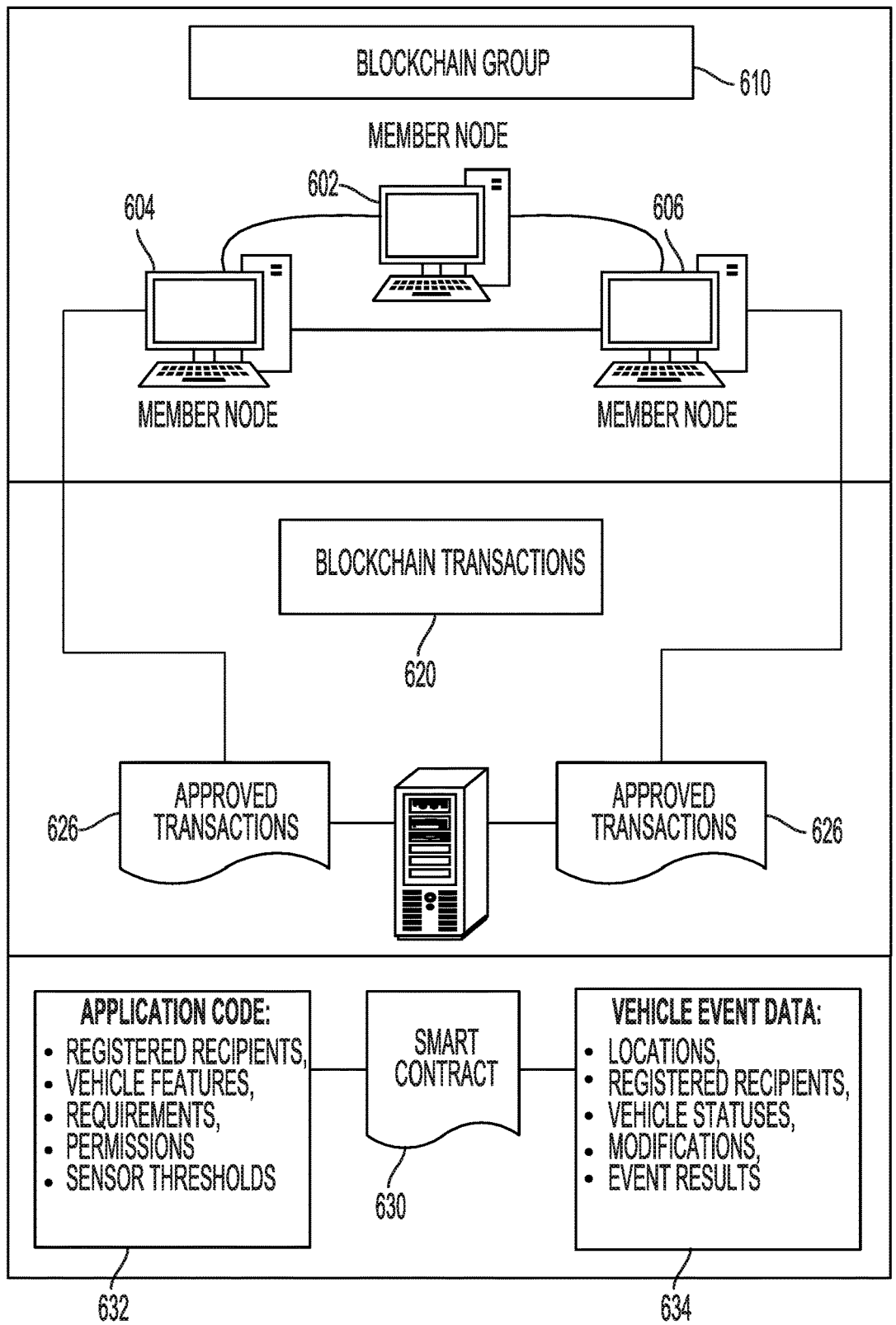
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
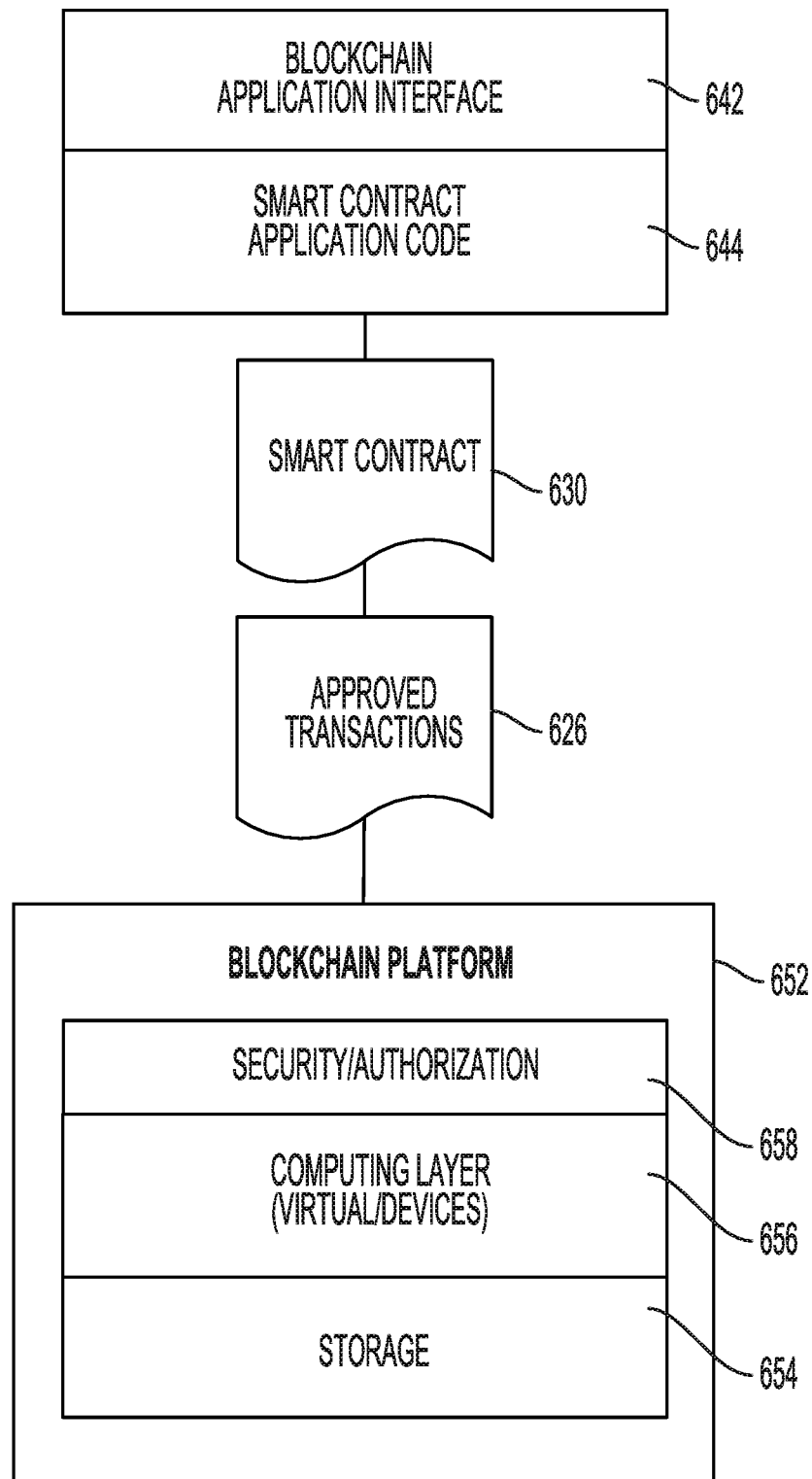
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
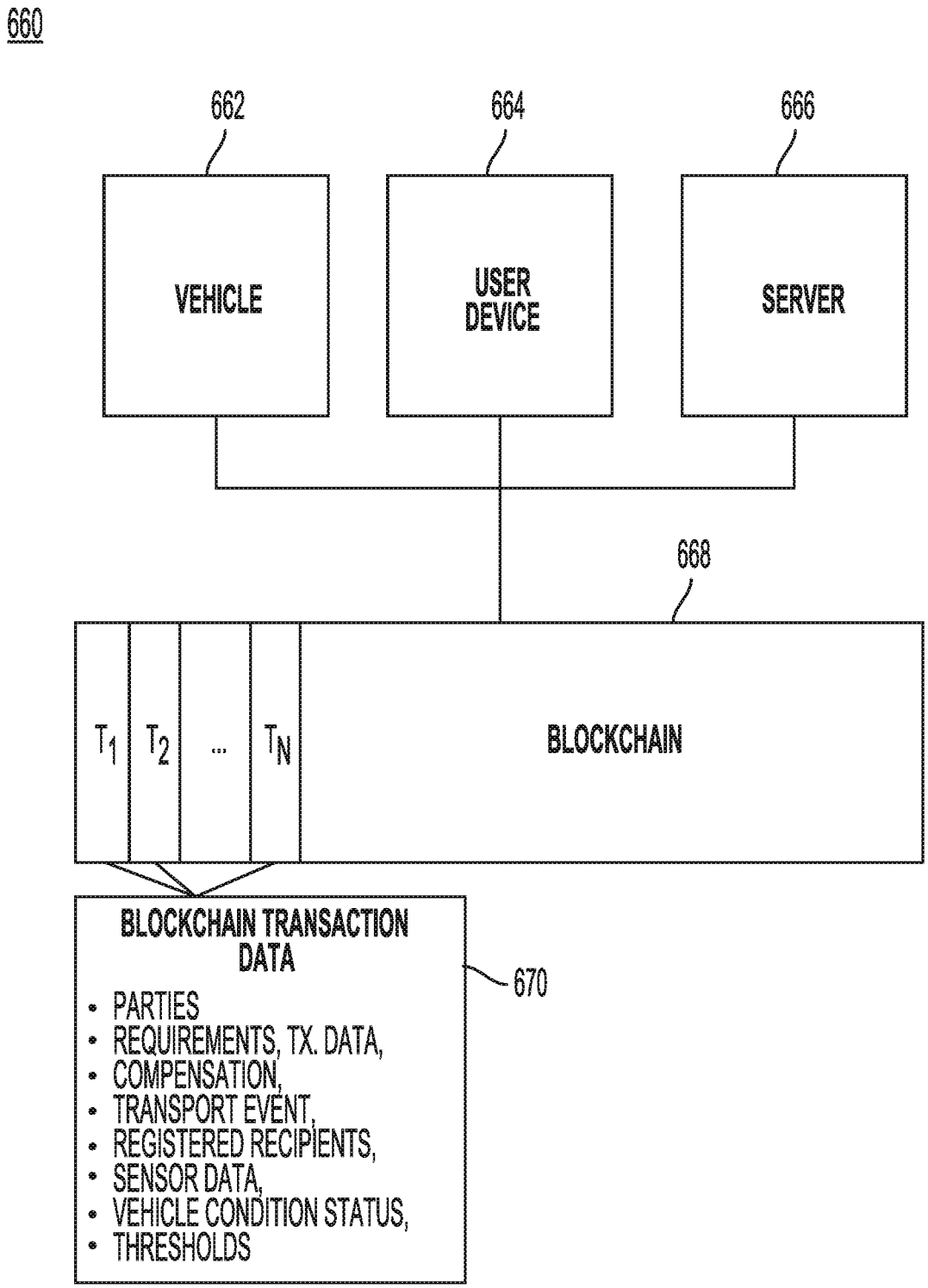
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
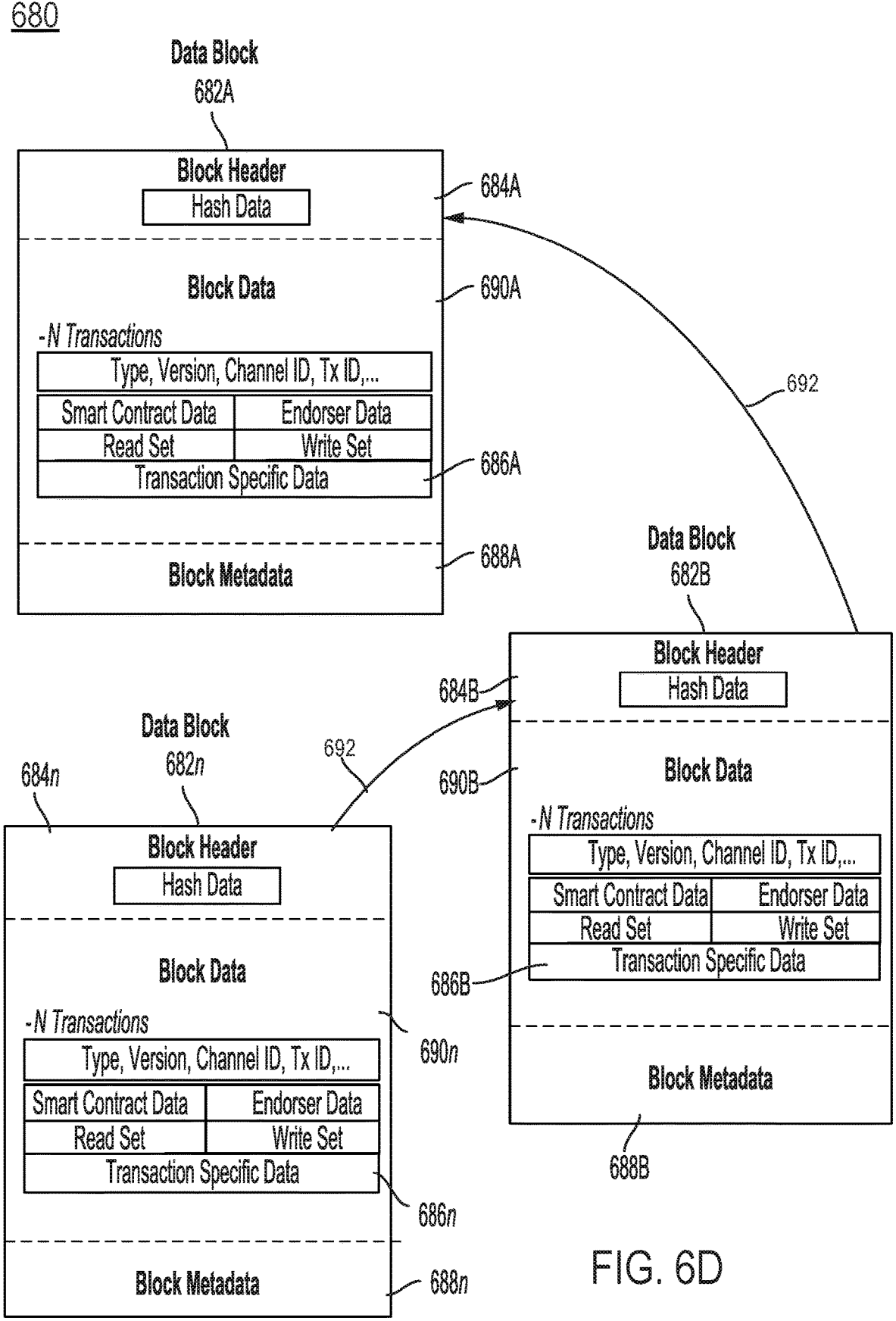
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
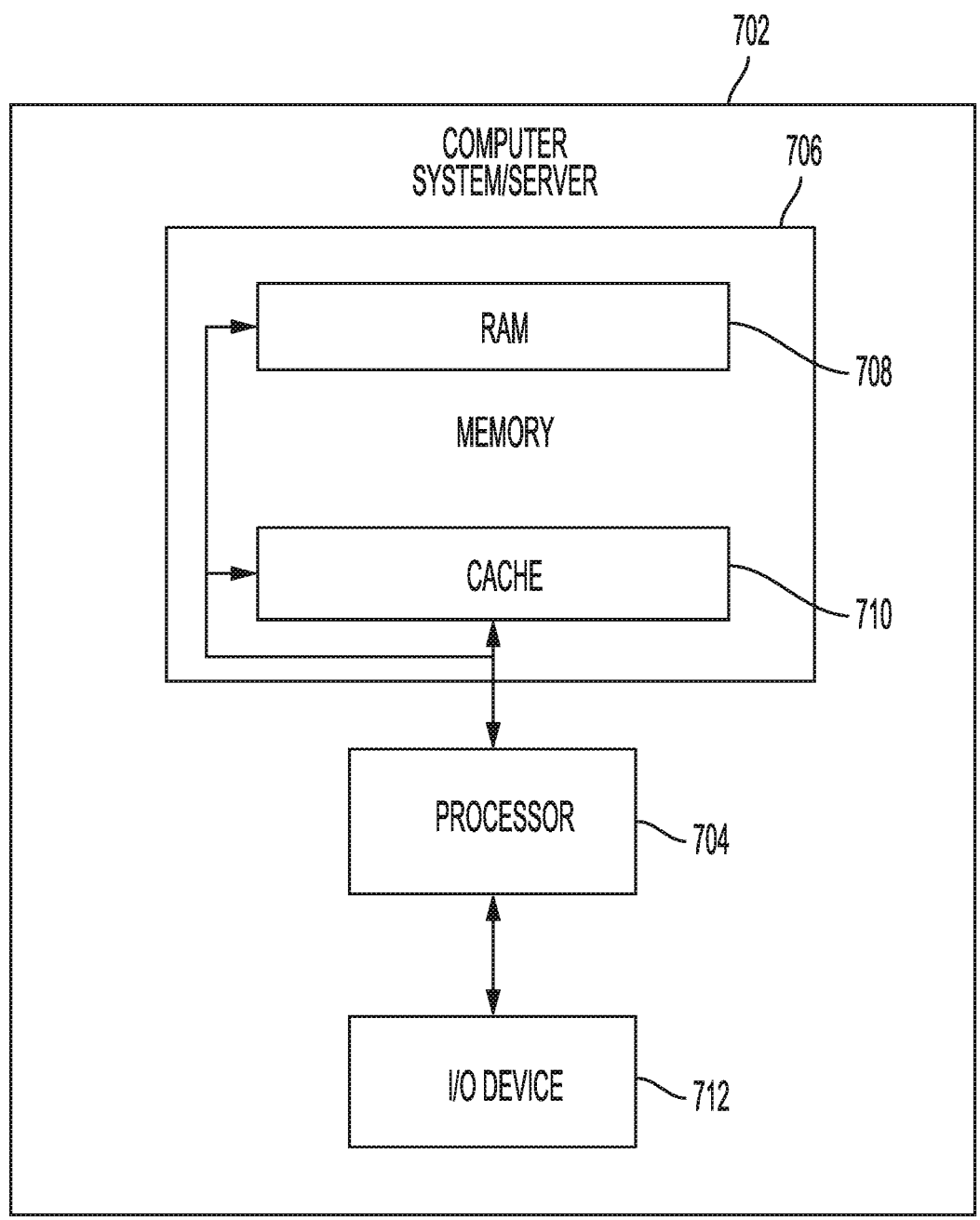
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also beat least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent. While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving indications from a plurality of transports, by a server, of another transport in proximity to the plurality of transports, each indication comprising an identifier of the other transport and an identification of one or more ways the other transport is being operated in a different manner than intended;
   forming a consensus, by the server, from the indications from the plurality of transports;
   in response to the consensus, determining, by the server, a behavior pattern comprising the identification of one or more ways the another transport is being operated in a different manner than intended; and
   matching the behavior pattern to one or more of a different type of transport than the another transport and a different way of operating the other transport.

2. The method of claim 1, comprising:
   transmitting, by the server, a notification to one or more of the another transport and a device associated with the another transport, in response to the consensus.

3. The method of claim 2, wherein the notification comprises one or more of the different type of a transport and the different way of operating the other transport.

4. The method of claim 1, wherein the identifier of the other transport comprises one or more of a camera image and a physical description of an exterior of the other transport.

5. The method of claim 1, wherein the one or more ways the other transport is being operated in a different manner than intended comprises one or more of a speed, an acceleration, towing performance, and cargo capacity of the other transport.

6. The method of claim 1, comprising:
   creating, by each of the plurality of transports, a blockchain transaction comprising the indications, wherein each of the plurality of transports, the other transport, and the server are nodes or peers of a blockchain network.

7. The method of claim 6, wherein one or more of the transports, the other transport, and the server form the consensus by validating the blockchain transactions.

8. A transport, comprising:
   a processor; and
   a memory, coupled to the processor, comprising instructions that when executed by the processor are configured to:
      receive indications from a plurality of transports of another transport in proximity to the plurality of transports, each indication comprising an identifier of the other transport and an identification of one or more ways the other transport is being operated in a different manner than intended;
      form a consensus from the indications from the plurality of transports;
      in response to the consensus, determine, by the server, a behavior pattern comprising the identification of one or more ways the another transport is operated in a different manner than intended; and
      match the behavior pattern to one or more of a different type of transport than the another transport and a different way to operate the other transport.

9. The transport of claim 8, further configured to:
   transmit, by the server, a notification to one or more of the another transport and a device associated with the another transport, in response to the consensus.

10. The transport of claim 8, wherein the notification comprises one or more of the different type of transport and the different way of operating the other transport.

11. The transport of claim 8, wherein the identifier of the other transport comprises one or more of a camera image and a physical description of an exterior of the other transport.

12. The transport of claim 8, wherein the one or more ways the other transport is being operated in a different manner than intended comprises one or more of a speed, an acceleration, towing performance, and cargo capacity of the other transport.

13. The transport of claim 8, further configured to:

create, by each of the plurality of transports, a blockchain transaction comprising the indications, wherein each of the plurality of transports, the other transport, and the server are nodes or peers of a blockchain network.

14. The transport of claim 13, wherein one or more of the transports, the other transport, and the server form the consensus by validating the blockchain transactions.

15. A non-transitory computer readable medium comprising instructions, that when read by a processor, cause the processor to perform:

receiving indications from a plurality of transports, by a server, of another transport in proximity to the plurality of transports, each indication comprising an identifier of the other transport and an identification of one or more ways the other transports being operated in a different manner than intended;

forming a consensus, by the server, from the indications from the plurality of transports;

in response to the consensus, determining, by the server, a behavior pattern comprising the identification of one or more ways the another transport is being operated in a different manner than intended; and matching the behavior pattern to one or more of a different type of transport than the another transport and a different way of operating the other transport.

16. The non-transitory computer readable medium of claim 15, wherein the instructions cause the processor to further perform:
transmitting, by the server, a notification to one or more of the another transport and a device associated with the another transport, in response to the consensus.

17. The non-transitory computer readable medium of claim 16, wherein the notification comprises one or more of the different type of transport and the different way of operating the other transport.

18. The non-transitory computer readable medium of claim 15, wherein the identifier of the other transport comprises one or more of a camera image and a physical description of an exterior of the other transport, wherein the one or more ways the other transport is being operated in a different manner than intended comprises one or more of a speed, an acceleration, towing performance, and cargo capacity of the other transport.

19. The non-transitory computer readable medium of claim 15, wherein the instructions cause the processor to further perform:

creating, by each of the plurality of transports, a blockchain transaction comprising the indications, wherein each of the plurality of transports, the other transport, and the server are nodes or peers of a blockchain network.

20. The non-transitory computer readable medium of claim 19, wherein one or more of the transports, the other transport, and the server form the consensus by validating the blockchain transactions.

\* \* \* \* \*